US009053324B2

(12) United States Patent
Cedervall et al.

(10) Patent No.: US 9,053,324 B2
(45) Date of Patent: Jun. 9, 2015

(54) IPTV DEVICES AND METHODS ADAPTED FOR SUCH DEVICES

(75) Inventors: Mats Cedervall, Härnösand (SE); Nilo Mitra, New York, NY (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 455 days.

(21) Appl. No.: 12/687,360

(22) Filed: Jan. 14, 2010

(65) Prior Publication Data
US 2010/0235875 A1 Sep. 16, 2010

Related U.S. Application Data

(63) Continuation of application No. PCT/SE2009/050779, filed on Jun. 22, 2009.

(60) Provisional application No. 61/149,424, filed on Feb. 3, 2009, provisional application No. 61/144,546, filed on Jan. 14, 2009.

(51) Int. Cl.
H04N 7/173 (2011.01)
G06F 21/57 (2013.01)
G06F 9/445 (2006.01)
(Continued)

(52) U.S. Cl.
CPC .......... *G06F 21/572* (2013.01); *G06F 8/65* (2013.01); *H04N 21/42684* (2013.01); *H04N 21/4432* (2013.01); *H04N 21/4586* (2013.01); *H04N 21/6125* (2013.01); *H04N 21/6175* (2013.01)

(58) Field of Classification Search
CPC .............. H04N 21/42684; H04N 21/6175; H04N 21/6125; H04N 21/4432; H04N 21/4586

USPC .................. 725/130, 131, 109, 110
See application file for complete search history.

(56) References Cited

U.S. PATENT DOCUMENTS 6,745,245 B1 * 6/2004 Carpenter ............... 709/229
2002/0133412 A1 9/2002 Oliver et al.
(Continued)

FOREIGN PATENT DOCUMENTS

CN 101001316 A 7/2007
CN 101009764 A 8/2007
(Continued)

OTHER PUBLICATIONS

Open IPTV Forum, OIPF Functional Architecure, V 1.2, Dec. 8, 2008, pp. (31-54).*
(Continued)

*Primary Examiner* — Brian T Pendleton
*Assistant Examiner* — Alan Luong
(74) *Attorney, Agent, or Firm* — Patent Portfolio Builders PLLC

(57) ABSTRACT

Methods and apparatus for enabling upgrading of a television (TV) device that is connectable to an internet protocol TV (IPTV) system including an operator system and a TV manufacturer system are described. The upgrading is based on a token object and verifies a requested upgrading of the TV device. A token object is generated at the TV manufacturer system in response to receiving a request for upgrading from the TV device, and delivered to the TV device, thus enabling the TV device to complete the requested upgrading process due to possessing a valid token. A TV device, an operator system, and a TV manufacturer system adapted to execute the suggested methods are also provided.

15 Claims, 5 Drawing Sheets

(51) Int. Cl.
*H04N 21/426* (2011.01)
*H04N 21/443* (2011.01)
*H04N 21/458* (2011.01)
*H04N 21/61* (2011.01)

(56) References Cited

U.S. PATENT DOCUMENTS

| | | | |
|---|---|---|---|
| 2003/0105871 A1* | 6/2003 | Goldick | 709/229 |
| 2004/0031058 A1* | 2/2004 | Reisman | 725/112 |
| 2004/0054915 A1 | 3/2004 | de Jong et al. | |
| 2005/0228798 A1 | 10/2005 | Averbuch et al. | |
| 2006/0020679 A1* | 1/2006 | Hinton et al. | 709/217 |
| 2006/0129686 A1 | 6/2006 | Tanaka | |
| 2008/0040767 A1* | 2/2008 | McCarthy et al. | 725/132 |
| 2009/0077549 A1* | 3/2009 | Sadja et al. | 717/178 |
| 2009/0235299 A1* | 9/2009 | Astrom et al. | 725/25 |
| 2010/0017840 A1* | 1/2010 | Akins et al. | 725/131 |
| 2011/0138432 A1 | 6/2011 | Mitra et al. | |
| 2011/0154408 A1 | 6/2011 | Svensson et al. | |

FOREIGN PATENT DOCUMENTS

| | | |
|---|---|---|
| CN | 101137049 A | 3/2008 |
| CN | 101296146 A | 10/2008 |
| JP | 2005259115 A | 9/2005 |
| JP | 2007201911 A | 8/2007 |
| KR | 100737119 A | 7/2007 |
| KR | 100835984 A | 6/2008 |
| KR | 100856657 B1 | 9/2008 |
| WO | 02/45316 A2 | 6/2002 |

OTHER PUBLICATIONS

Open IPTV Forum Terminal Function, Working Draft 20, Sep. 2007.*

Swedish Patent Office, Int'l Search Report in PCT/SE2009/050779, Mar. 30, 2010.

Swedish Patent Office, Int'l Prelim. Report on Patentability in PCT/SE2009/050779, Jul. 19, 2011.

EPO, Extended European Search Report in EP 099838491, Feb. 13, 2014.

Open IPTV Forum, Functional Architecture V1.2, Dec. 8, 2008, pp. 1-143.

ETSI, Remote Management and Firmware Update System for DVB IP Services, Technical Specification 102 824 v1.1.1, Jul. 2008, pp. 1-72.

* cited by examiner

IPTV DEVICES AND METHODS ADAPTED FOR SUCH DEVICES

This application claims the benefit of the filing dates of U.S. Provisional Patent Applications No. 61/144,546 filed on Jan. 14, 2009, and No. 61/149,424 filed on Feb. 3, 2009, and International Application No. PCT/SE2009/050779 filed on Jun. 22, 2009, all of which are incorporated in this application by reference.

TECHNICAL FIELD

This application generally relates to an internet protocol television (IPTV) system, comprising an operator system and a TV manufacturer system, and more particularly to a mechanism for IPTV devices connectable to such a system.

BACKGROUND

As television (TV) distribution networks move from one-way distribution toward two-way interactive communication networks and from solutions that allow services to be consumed only in one location toward being consumed anywhere on a wide range of types and sizes of screens, we are about to witness the birth of an entirely new mass market for TV program advertising, interactive games and other services.

Interactivity through wire-line and wireless two-way networks will make it possible for viewers to participate in many ways, such as e.g. enabling users to vote in TV shows, to buy products by interacting with advertisements, and to send personal messages to TV shows. The viewer will have new possibilities when it comes to personalization, such as e.g. the possibility to choose which ads to receive in targeted advertising, how TV programs are to be listed in an electronic program guide (EPG) or which program content to consume and when to consume them.

IPTV offers new revenue opportunities for telecom service providers when it comes to attracting new customers to their networks in order to offset declining voice traffic revenues. It may be that wire-line telecom service providers will move into IPTV to a great extent. With IPTV, telecom service providers can start to compete with TV offerings from cable operators, satellite-TV operators, and other terrestrial service providers. IPTV also helps providers retain existing customers and prevent churn by introducing a bundled offering of Internet, voice, and IPTV services, typically referred to as "triple play".

IPTV uses web-browser technology to enable IPTV Service Providers to provide media services deployed in communication networks, such as wired and wireless telephone networks. Common Web browser applications enable users to view specific Internet pages and other file locations, accessible by the browser. Each such Web page is typically identified by a Uniform Resource Identifier (URI), or similar page address.

In an IPTV system, multimedia streams are encoded as series of IP data packets. Work on IPTV is underway in several contexts, including for example the Open IPTV Forum, which is specifying an end-to-end platform for supplying multimedia and IPTV services to user equipments (UEs) over the Internet and managed networks having controlled quality-of-service (QoS) performance.

In an IPTV system, a UE or IPTV device may be a Set-Top Box (STB) or a TV having integrated STB capabilities. Such a user device may be configured to access IPTV services, e.g., via an IP Multimedia System (IMS). With the ongoing rapid development of new services offered via IPTV distribution, and of user interfaces which enable user-friendly access to such services, there is a problem for the TV manufacturer to be able to provide their IPTV devices with the most suitable service profile already at manufacturing of the IPTV device.

SUMMARY

There is a desire to have different service profiles available for IPTV terminal devices, such as, e.g., Open IPTV Forum terminal devices, also referred to as Open IPTV Forum Terminal Functions (OITFs). Such terminals could have various functions implemented, e.g., in a Set-Top Box (STB) or in a TV set that is provided with Open IPTV Forum Terminal Function (OITF) functions.

One way of implementing the use of different service profiles may be to offer users of TV devices two different profiles with integrated OITF functions: a first, simple service profile containing some basic functions, and a second, more feature-rich service profile. The first service profile may e.g. be aimed at accessing services from the so-called Open Internet, accessible over a broadband network without any quality of service (QoS) guarantees, while the second service profile could e.g. include functions that give a user of a TV device access to, and enable the user to utilize, the IPTV services managed by the user's Telecommunication Operator.

A question that arises is if there might be a way to initially build a TV device conforming to the first service profile, together with some mandatory software upgrade mechanism that can then be utilized, at an appropriate point in time determined by business criteria, to upgrade such TV devices to the second service profile.

The claimed invention refers to such an upgrade mechanism.

According to one aspect, a method for performing an upgrade of the TV device is provided to be executed at a TV device that is connectable to an IPTV system that includes an operator system and a TV manufacturer system. An upgrade service for a new IPTV service profile is initiated from a TV device, and an upgrade request message is transmitted to an operator system. The operator system acquires a token object from a TV manufacturer system and forwards the acquired token object to the TV device, which can use the token object for verifying the requested upgrade of the TV device. By returning the token object to the TV manufacturer system, the TV manufacturer system completes the upgrade of the TV device if the token object is found to be valid.

According to another aspect, a method for upgrading a TV device is provided to be executed at an operator system, being part of an IPTV system that also includes a TV manufacturer system. The operator system responds to the receiving of an initiation of an upgrade service for a new IPTV service profile, and an upgrade request message from the TV device, by requesting a Token Object to be used during the requested upgrading, from the TV manufacturer system. Once a Token Object has been received from the TV manufacturer system, the operator system forwards the token object to the TV device, thereby enabling the TV device to execute the requested upgrading by interacting with the TV manufacturer system if the token object is found to be valid.

According to yet another aspect, a method to be executed at a TV manufacturer system, being part of an IPTV system that also includes an operator system, when a TV device is to be upgraded is also provided. At the TV manufacturer system, a token object is generated, in response to receiving a request for a token object, to be used for verifying the requested upgrading, from the operator system. The token object is then transmitted to the TV device in order to enable the TV device to execute the requested upgrading by interacting with the TV manufacturer system if the token object is found to be valid.

Before requesting an upgrade from the TV manufacturer system, the TV device can request an upgradability check, by which it is determined whether the TV device is upgradable or not. Such an upgradability check may be executed either at the operator system, or at the TV manufacturer system.

In order to be able to provide a secure upgradability check, such a procedure can rely on some kind of information, such as e.g. a TV device unique identity, a model number, a serial number, or a firmware identifier of the TV device, that allows identification of the TV device.

According to one aspect, a valid token object can be provided to the requesting TV device before an actual proprietary upgrade procedure. According to another, alternative aspect, the valid token object can be provided to the TV device as part of the proprietary upgrade procedure.

In addition, a TV device that is adapted to initiate the suggested upgrading method, as well as a TV operator system, and a TV manufacturer system, which are adapted to assist in and execute a requested upgrading method are also provided.

Other objects, advantages, and novel features of the suggested method, apparatus, and systems will become apparent from this description when considered in conjunction with the accompanying drawings. These objects and others can be achieved primarily by solutions according to the appended independent claims.

BRIEF DESCRIPTION OF THE DRAWINGS

The invention will be understood by making reference to this description together with the accompanying drawings, in which.

DETAILED DESCRIPTION

Figure 1:
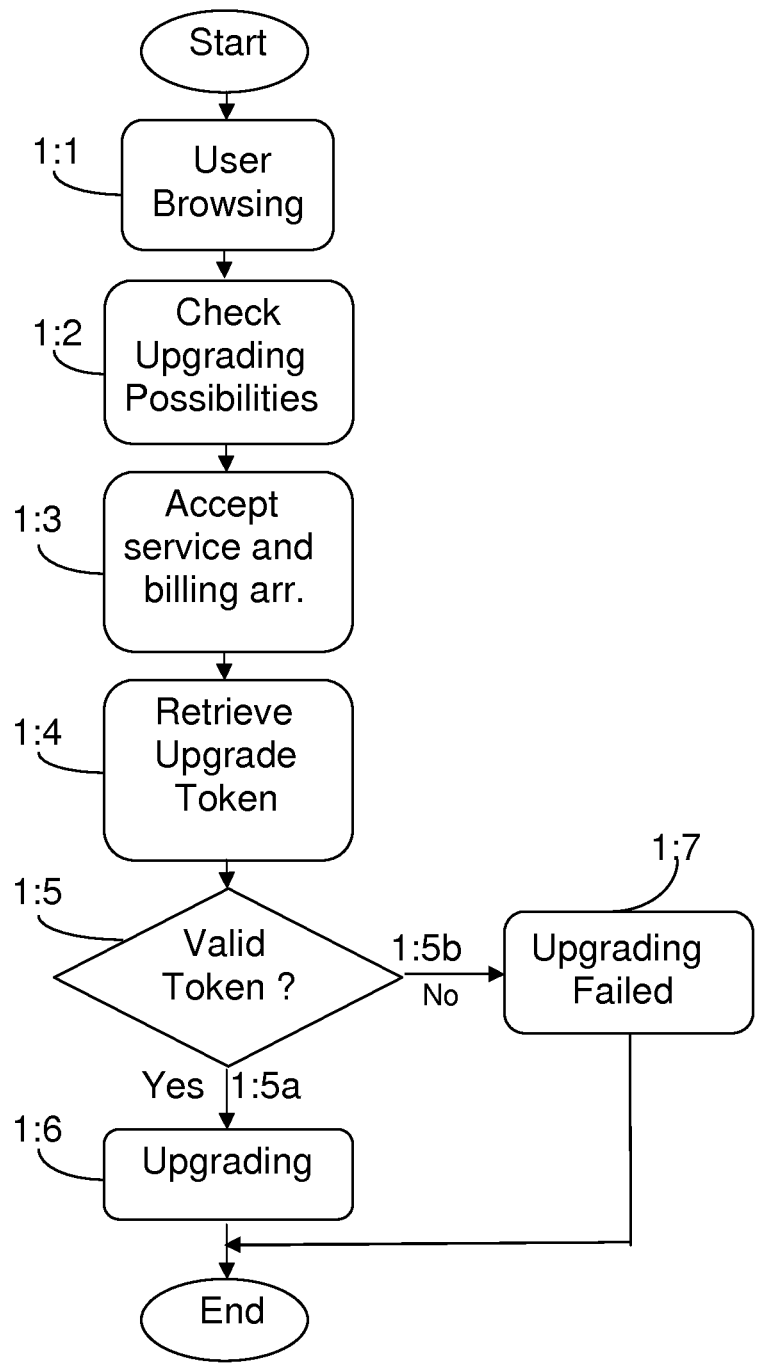
FIG. 1 is a block scheme, illustrating a method of upgrading a TV device that is connectable to an IPTV system, comprising an operator system and a TV manufacturer system.

An upgrading mechanism suitable for enabling remote upgrading of TV devices will be described in more detail below with reference to the accompanying FIGS. 1-6. Throughout these drawings, the same reference characters will be used for corresponding or similar elements.

The embodiments described here assume that a user is provided with a TV device that is connected to a broadband IPTV network and that initially conforms to a less-advanced service profile than one needed to access more-advanced service features. In order to be able to access the advanced service features, methods of upgrading the TV device are therefore described, where a service profile can be remotely upgraded to a more advanced service profile.

Alternatively, a more advanced service profile may already be available at the TV device, but inactivated when offered to the user by a TV manufacturer.

According to yet another scenario, the TV device may already have an advanced service profile activated, but require such a service profile to be replaced by another, updated version.

Consequently, there is a desire for an upgrading mechanism that involves either a procedure for installing an advanced service profile from a remote location, or for activating an already installed service profile.

There is also a desire for a straightforward mechanism for verifying such a requested upgrading.

A method suitable for initiating and completing a service profile upgrading of a TV device will now be described in more detail, with reference to the flow chart of FIG. 1, where the method steps to be executed at the TV device are described.

Through some means, which can be an advertisement with a URL, a pop-up on a TV screen, or an active search that is made on a Web page via a TV browser, a user reaches an operator portal which provides information on an operator's managed service. This is indicated with a first step 1:1 in FIG. 1.

Via a selected User Interface, the user is presented with information on the services provided by the operator, as well as some indication of the one or more types and characteristics of devices that may be able to consume such services. Previously defined hypertext transfer protocol (HTTP) headers may be automatically sent to the operator portal from the TV browser, carrying information on some specific features of the user's TV device that can be used to determine the capability of the TV device for one or more enhanced services. The user might even be faced with an offer from the operator to, after approval from the user, initiate a check of the user's TV device, for determining whether the TV device can actually be upgraded to a specific, enhanced service. In such a case, the TV browser may be redirected to a site belonging to the TV manufacturer where a TV manufacturer specific protocol could be used to determine if the TV device can be upgraded. The response can be redirected back to the operator portal, where a suitable page can be presented to the user.

In order to be able to check the upgradability for a specific TV device, the TV device has to be suitably identifiable. This may be achieved by retrieving some type of number or identifier, such as e.g. a model number, a firmware identifier, a serial number, that uniquely identifies the TV device, and by providing this identifier to the TV manufacturer via the operator, where it can be used during an upgradability check. Such a procedure for checking for upgrading possibilities is indicated with a next step 1:2.

Assuming that it has been determined that the TV device is capable of being upgraded, a typical next step would then be for the operator to present to the user an option to accept service and billing arrangements, such as e.g. the price and terms of the upgraded service, that has previously been communicated and agreed upon between the operator and the TV device user. The user can then choose to accept the terms for subscribing to the preferred upgraded service, e.g., by clicking on a link on the Operator Portal, after which the Operator verifies the payment information, and proceeds to the upgrade. Such a procedure is indicated with a subsequent step 1:3 in FIG. 1. Procedures for managing service and billing arrangements in association with browsing a service are well known in the art, and can be achieved in a number of various ways. Therefore, these particular aspects need not be described in any further detail.

At this point, an upgrade mechanism that links an upgrading to a specific TV device is ready to start. In response to the user's acceptance, and the operators approval, a sub-system of the operator, typically referred to as the operator's business support system, communicates with the TV manufacturer, typically via a Business Support System of the TV Manufacturer's, in order to obtain a token object that may later be used for verifying the requested upgrade of the specific TV device. The request for a token object carries some TV device unique identification information, which is typically identical to the identification information that was previously used for the upgradability check, executed in step 1:2. From hereinafter this information will be referred to as device ID.

The TV manufacturer, being able to identify the TV device, then generates a unique token object, which is returned to the TV device via the operator. The described procedure for retrieving a token object is indicated with a step 1:4 in FIG. 1.

In addition to serve as an authorization mechanism, the token object also serves as a link between the operator and the TV manufacturer. That is, towards the TV manufacturer, this token object will be able to provide proof that establishes that the TV device to be upgraded is one of the operator's subscribers.

In addition, when subsequently presented by the TV manufacturer to the operator, the token object will be able to allow the TV manufacturer to be paid by the operator for the upgrade, under the prerequisite that such a pre-defined business arrangement exists between the Operator and the TV manufacturer.

In a next step 1:5 it is determined whether a valid token object can be provided to the TV manufacturer from the TV device, i.e., if steps 1:1-1:4 have progressed successfully, and, thus, if a requested upgrading can be executed.

If the procedure described above has been successfully executed, the TV device will be able to provide a valid token to the TV manufacturer, as indicated with a step 1:5a, and thus, the actual upgrade, i.e., the procedure for activating or replacing a specific version of a certain service profile at the TV device can now take place between the TV manufacturer's site and the TV device, using any proprietary upgrade mechanism, that has previously been specified according to the TV manufacturer's preferences. Such an Upgrading procedure is indicated with a subsequent step 1:6, while if no valid token object can be provided by the user, as indicated with step 1:5b, the upgrading fails, as indicated with another step 1:7.

Since already today it is possible for TV manufacturers to provide proprietary protocols for the actual upgrade procedure, this specific procedure does not have to be changed if the suggested arrangement is applied. It is however to be understood that such a proprietary upgrade procedure can also be adapted in various ways, depending on additional issues to be considered, such as e.g. security.

Since the details of the proprietary upgrade procedure are out of the scope of the upgrade mechanism presented in this document, which rather refers to a mechanism for triggering a request for an upgrade and enabling a reliable way of verification prior to executing the actual upgrading of a TV device, the steps for executing the actual proprietary upgrade procedure will not be described in any further detail in this document.

Below, the suggested mechanisms for triggering an upgrade as well as verification prior to and after an upgrade will be described in further detail according to two different embodiments, with reference to FIGS. 2 and 3, respectively.

Figure 2:
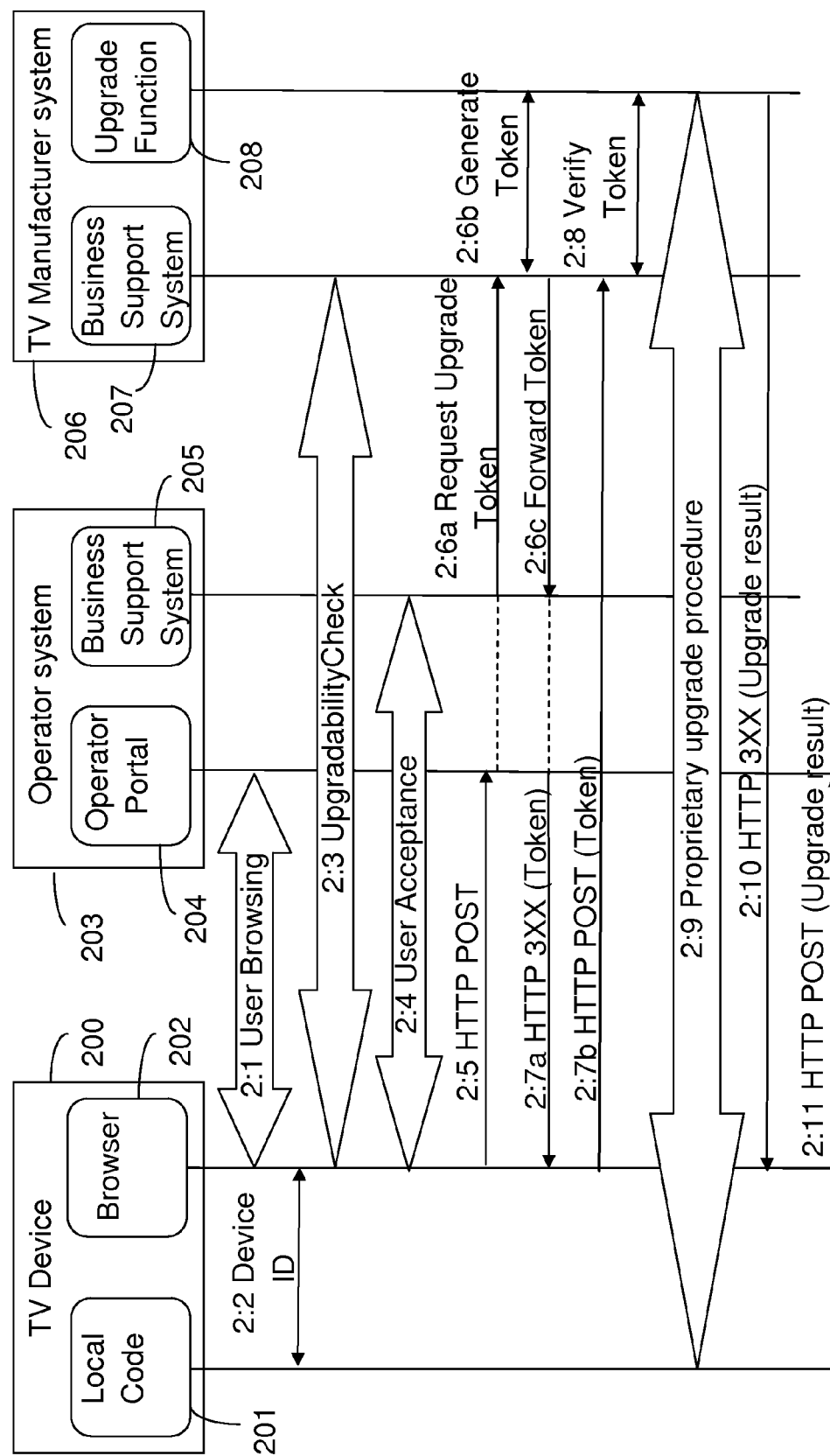
FIG. 2 is a sequence diagram, illustrating the execution of an upgrading method according to one embodiment.

FIG. 2 is an illustration of a possible call flow which is basically based on HTTP signaling between a TV device and an operator system and a TV manufacturer system, respectively, where a Token Object generated by the TV Manufacturer system is verified at the TV manufacturer system prior to initiation of a Proprietary upgrade procedure.

In a first step 2:1, a user browses to an operator portal where he is presented with one or more possibilities of subscribing to advanced services, which in this context includes the option to upgrade the TV device from a less advanced service profile to a more advanced service profile, or for activating an advanced service profile that has been pre-installed in the TV device. Such a procedure is typically achieved by the user executing normal browsing HTTP interactions between a Browser 202, being part of the TV device 200, and an Operator portal 204 of the subscriber's operator 203.

Next an operation for determining whether the TV device 200 is compatible, or if it is possible to upgrade it, is executed. This check is based on TV device specific information, e.g., device ID, which, according to step 2:2, may be retrieved by the browser 202 of TV device 200 from predefined Local Code 201, while the subsequent upgradability check is executed between TV device 200 and a TV manufacturer system 206, typically via the operator system 203, according to another step 2:3. The upgradability check of step 2:3 will typically be executed by a business support system 207 of the TV manufacturer system 206, as indicated in FIG. 2.

The device ID, possibly together with some additional information, will at a later stage enable verification and execution of the actual service profile upgrade at the TV device 200. This information is typically forwarded to the operator portal 204 via one or more HTTP headers.

If, in step 2:3, it is found that it is possible to upgrade the TV device 200, the operator system 203 requires consent from the user of TV device 200, and if such consent, which normally involve the user's acceptance of payment for the upgraded service, is given by the user, as indicated with a next step 2:4, the initiated interaction can continue by requesting for a unique Upgrade Token from the TV manufacturer system 206.

If the operator system 203 has verified that the TV device 200 is upgradable and if the user of the TV device 200 has committed to accept the offered updating service and has provided necessary billing information, possibly together with any additional information that may be required for a continuation of the ongoing interaction from the service point of view, the upgrading mechanism can start after approval by the user, e.g., by clicking on a final "OK" on the screen.

In FIG. 2, the requesting for a token object is initiated by transmitting the request, carrying the device ID, from the browser 202 to the operator portal 204 via a HTTP POST, as indicated with a step 2:5.

In a next step 2:6a, the operator uses the information obtained in step 2:5 to request a Token Object from the TV manufacturer system 206. On the basis of this information, a token object is generated, as indicated with a subsequent step 2:6b, and forwarded to the operator system 203 in a subsequent step 2:6c, together with a redirection address, indicating the TV manufacturer's upgrade site.

The token object may be used later on by the business support systems of the operator and the TV manufacturer as a link to any established business relation between the operator and the TV manufacturer which are related to the initiated upgrade.

In a subsequent step 2:7a, the Token Object is forwarded to the TV device 200, in a HTTP 3xx response, comprising a redirection indicator and a redirection address, e.g., the address to the TV manufacturer's upgrade site. The TV device 200 redirects the received message to the TV manufacturer system 206, as indicated with another step 2:7b.

In a subsequent step 2:8, the token object is verified at the TV manufacturer system 206, and if the token object is found to be valid, an upgrade function 208 initiates a proprietary upgrade mechanism, as indicated with a next step 2:9. By using the token object, originally provided from the TV manufacturer system 206 and the device ID, with or without additional information, provided to the TV manufacturer system 206 by the TV device 200, the TV manufacturer will be able to ensure that a firmware/software download associated with the requested upgrade can be encrypted, so that only the requesting TV device 200 can utilize it.

It is to be understood that step 2:9 can comprise different sub-steps and procedures applied according to the requirements from the different TV manufacturers. However, in general terms the upgrade function 208 allows the user of the TV device 200 to access the TV Manufacturer's upgrade site to continue the upgrade procedure. The result of an executed upgrade procedure is then returned to the TV device 200, typically via a HTTP 3XX, as indicated with a step 10, and further to the operator portal 204, typically by using HTTP redirect, and a HTTP POST message, as indicated with a subsequent step 2:11.

Figure 3:
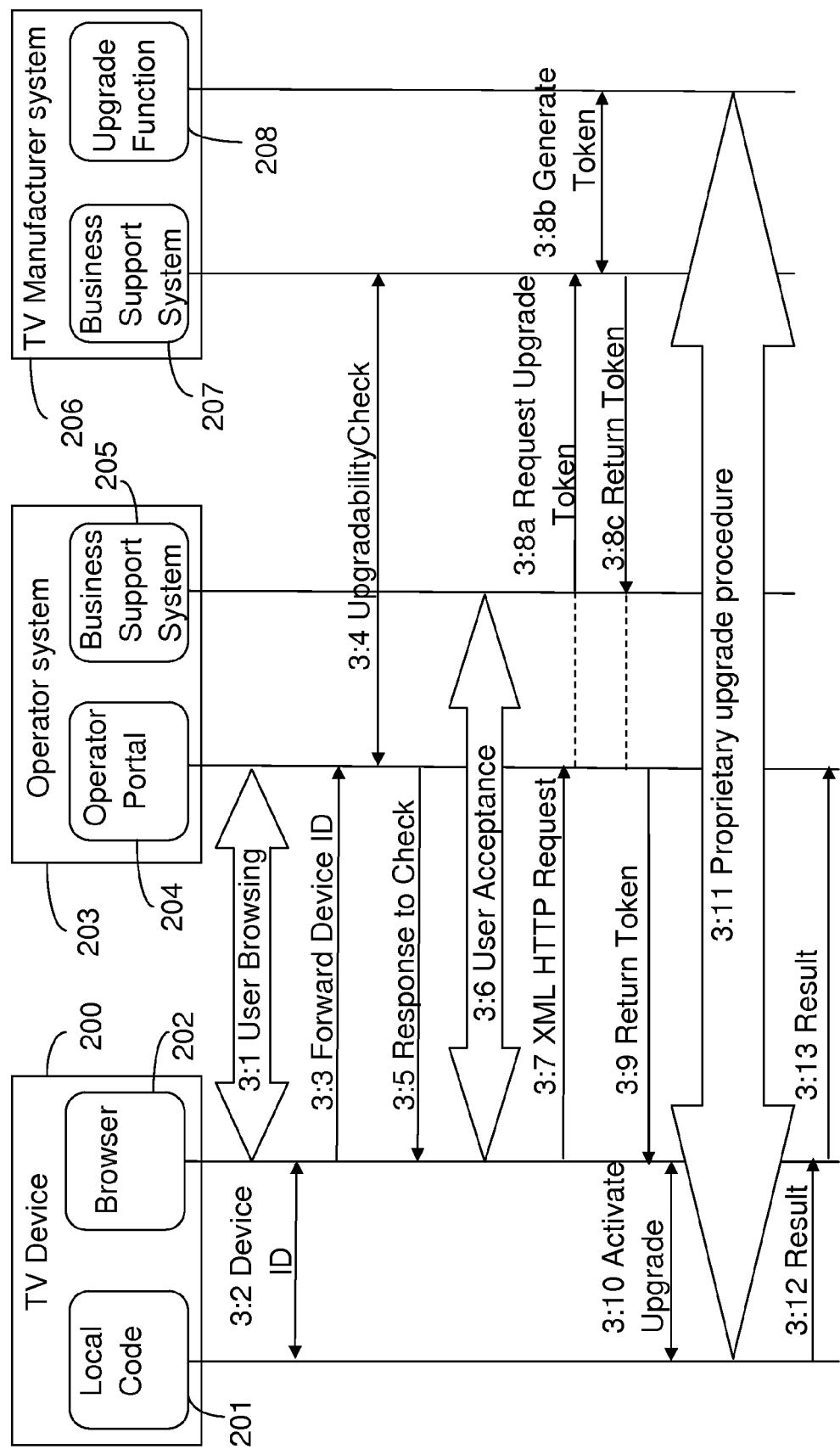
FIG. 3 is a sequence diagram, illustrating the execution of an upgrading method according to another embodiment.

FIG. 3 is another example of flow showing how the suggested upgrade mechanism may be executed according to another, alternative embodiment. According to this second embodiment, the interaction is instead based on embedded Java script, which may provide a higher degree of automated interaction to the user of the TV device 200, since it causes interactions between the browser and the back end servers without causing a reload of the Web page used for the service.

According to the second embodiment, a generated token object will also be returned as part of the Proprietary upgrade procedure, instead of acting as a prerequisite for even starting a proprietary upgrade procedure at all, as was the case for the first embodiment.

After a user has initiated an interaction with an operator portal 204 of operator system 203 from a browser 202, as indicated with a first step 3:1, browser 202 requests for, and obtains TV device specific information, e.g., device ID, from a memory (not shown), associated with local object code 201. In a typical embodiment, the Web page contains embedded Java script code that, when loaded by the browser 202, makes a Java script API call from the browser 202 to the TV device's local code 201 to obtain information about the device. In resemblance to the first embodiment, the term "device ID" used in the figure may be used to capture whatever information is needed by a TV manufacturer to identify specific characteristics of the TV device 200, including both software and hardware, such as e.g. model number and/or firmware version, that will help the TV manufacturer in determining the suitability of the TV device 200 for upgrading to a more advanced service format. This information is typically originally created at the TV manufacturer system 206 and can e.g. be an opaque string that can only be deciphered by the creator, e.g., the TV manufacturer system 206, using any conventional ciphering/deciphering mechanism. Any suitable API could be used for this purpose. The exchange of device ID from local code 201 to browser 202, is indicated with step 3:2 in FIG. 3.

In resemblance to the former embodiment, an upgradability check is then executed. In FIG. 3, this procedure has been divided into three separate sub-steps indicated as steps 3:3-3:5. It is to be understood that the upgradability check, indicated with step 2:3 in FIG. 2, by way of one possible example, can be executed in a corresponding way.

In a step 3:3 the device ID is first sent to the operator portal 204, e.g. via a standard extensible mark-up language (XML) HTTP Request message. In this scenario, it is assumed that the Device ID is an opaque string that the operator is not able to decipher and, thus, to use for the purpose of checking whether the TV device 200 is compatible with the available service, or whether or not it is possible to upgrade it via TV manufacturer 206.

Instead the operator system 203 needs to consult the TV manufacturer system 206 to be able to determine the upgradability. The device ID is therefore sent in a message from the operator system 203 to the TV manufacturer system 206, and more specifically to a business support system 207, or any other sub-system configured for this purpose, to determine the upgradability.

As indicated with a step 3:4, this can be done e.g. via a HTTP Request that comprises an XML body, containing the device ID and possibly some other business related information. A response to this request will contain the result of the upgradability check, but may also contain additional business information that may be required for completing an initiated execution upgrade procedure.

If, as a result of the upgradability check described above, it is found that it is possible to upgrade the TV device 200, the operator network 203 returns such an indication. The result may be returned as a Web page, typically with an embedded Java script, comprising relevant service and ordering information. Such a responding step is indicated with another step 3:5.

In a subsequent step 3:6, the user of TV device 200 can use the information about the upgradability to interact with operator portal 204 in order to order the initiated upgrade service to be completed and to make relevant billing arrangements for the service, i.e., to accept an offer for the requested upgrading service.

In response to a successful completion of step 3:6, the suggested upgrade mechanism continues by requesting for an upgrade token object from TV Manufacturer system 206, by first forwarding the device ID from browser 202 to operator portal 204 in a step 3:7. According to the present embodiment this is done via an XML HTTP Request. The request is forwarded from the Operator system 203 to the TV manufacturer system 206, typically to a business support system 207, as indicated with a step 3:8a.

Since a token object provided from a TV manufacturer system is proprietary to the TV manufacturer, the device ID can be used to ensure validity and non-repudiation, i.e., that the software upgrade cannot be used by other TV devices. This information can also be used later on as a link to any business relation, such as for verifying a financial transaction, that in accordance with pre-defined agreements has been specified between the operator and the TV manufacturer in association with a requested upgrade. In addition to the device ID, a request, forwarded from operator system 206 to TV manufacturer system 206, as indicated with step 3:8a, or 2:6a if the former embodiment is applied, can also contain a parameter, typically referred to as the "operator domain", for ensuring that the returned token object can be used for only those TV devices that are subscribing to the operator's services, and that they cannot be used by any other TV device, even though it may potentially be upgradeable. If the device ID corresponds to an upgradeable TV device, a token object is generated in a step 3:8b. The Token Object is then returned to the operator system 203 in a next step 3:8c.

Once a token object has been provided to the operator system 203 it is forwarded to the respective browser page of TV device 200 in a response message, which typically will provide the user with at least the option of permitting an upgrade. This is indicated with a step 3:9. The browser page typically also contains embedded Java script code that is configured to start the requested upgrade/activation process.

If an upgrade is permitted by the user also from this step, a new Java script API, here referred to as activate upgrade, can be activated, in order to call relevant parts of the local code 201 on the TV device 200, as indicated with a next step 3:10. In addition to forwarding the token object, such an API may be carrying information, such as e.g. callback addresses for reporting either a success or failure of the requested upgrade procedure.

In a next step 3:11, TV device 200 and an upgrade site (not shown) of TV manufacturer system 206 initiates a proprietary upgrade procedure. Since the configuring of this step is up to the TV manufacturer, the sub-step to be executed in this procedure may vary from one TV manufacturer to another, when it comes to e.g. security aspects and applicable procedural upgrading steps. In a typical embodiment this procedure may include the execution of sub-steps for downloading of additional software, configured to execute the requested upgrading, from the TV manufacturer system 206 to the TV device 200, or simply an activation of upgrading software that is already existing on the TV device 200, e.g. as a result from software integration during manufacturing of the TV device.

Although the sub-steps of the proprietary upgrade procedure are up to the TV manufacturer to decide, the present embodiment assumes that such a procedure includes at least one or more sub-steps for enabling a valid token object to be returned to the TV manufacturer for verification of the requested upgrade procedure.

In subsequent steps following the proprietary upgrade procedure 3:11, the callback interface provided to browser 202 in step 3:10 may now be invoked, such that the result of the requested upgrade procedure is returned, first to the browser 202, as indicated with a step 3:12, and then to operator portal 204, as indicated with a final step 3:13.

Even though both embodiments described above refers to a call flow that is initiated by a user that has contacted an operator portal, it is to be understood that the critical techniques described above apply equally if the user's initial point of contact would instead be with a portal of the TV Manufacturer system. This may be the case where a TV device connected to an IPTV network has its "home page" set to the TV manufacturer's portal. In such a scenario, step 2:2 or 3:2 could be performed, and the user could be notified if his TV device is capable of any advanced upgradable service format. An icon linking to the operator's portal/services could for example be presented to the user, which could serve as a hint to the user to go to the operator's portal to determine if any service available there might be of interest. The activation of the software, i.e., the procedure described with step 2:4 or 3:6 onwards, respectively, would then be completed if it is verified that the user is a subscriber of the respective services provided by operator system 203.

Figure 4:
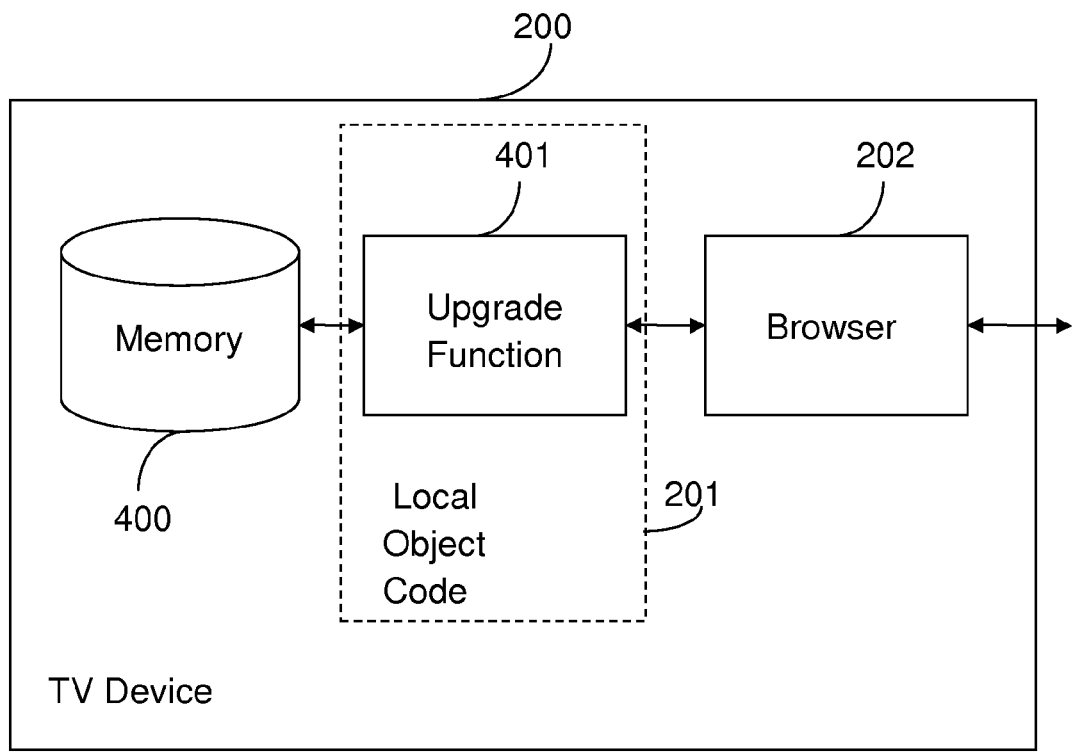
FIG. 4 is a block diagram, illustrating an upgradable TV device connectable to an IPTV system.

The separate systems and devices mentioned above will now be described in further detail below, in association with the accompanying FIGS. 4-6.

It is to be understood that a typical IPTV network in which the suggested upgrade mechanism is suitable to be applied also comprises additional functional units, such as e.g. conventional communication units. However, for simplicity reasons only those functional units that are needed for the understanding of the different embodiments of the upgrading mechanism suggested in this document will be described, while other functional entities have been omitted.

It is also to be understood that the described configurations represent only one possible solution and that the systems and entities used for executing the suggested upgrade mechanism can be configured in other alternative ways.

A TV device configured for initiating a remote upgrade mechanism according to the general principles presented above will now be described with reference to FIG. 4.

TV device 200 comprises a memory 400 for storing any type of device specific data, e.g., device ID, which is to be used for verifying that the TV device 200 is a device that can be upgraded by a TV manufacturer system (not shown). The TV device 200 also comprises a browser 202 that is configured to obtain communication with an operator system (not shown) and a TV manufacturer system 206, such that an upgrade procedure for upgrading of the TV device can be initiated by a user of the TV device 200, and completed by a TV manufacturer system 206. The browser 202 is also configured to participate in the upgrade mechanism by requesting for and receiving a token object, such that the retrieved token object can be used for verifying an upgrade prior to or during a proprietary upgrade procedure. In order to enable upgrading, the TV device 200 also comprises an upgrade function 401 that is configured to execute a proprietary upgrade procedure with the TV manufacturer system 206 that has issued a valid Token Object for the TV device 200. Consequently, the suggested upgrade function 401 is configured to complete an initiated upgrade procedure only in response to having recognized a valid token object from the TV device 200. The upgrade function 401 is typically implemented as a local object code 201 at the TV device 200.

An operator system that is configured to participate in an upgrade procedure as described above, according to one exemplary embodiment will be described below with reference to FIG. 5.

Figure 5:
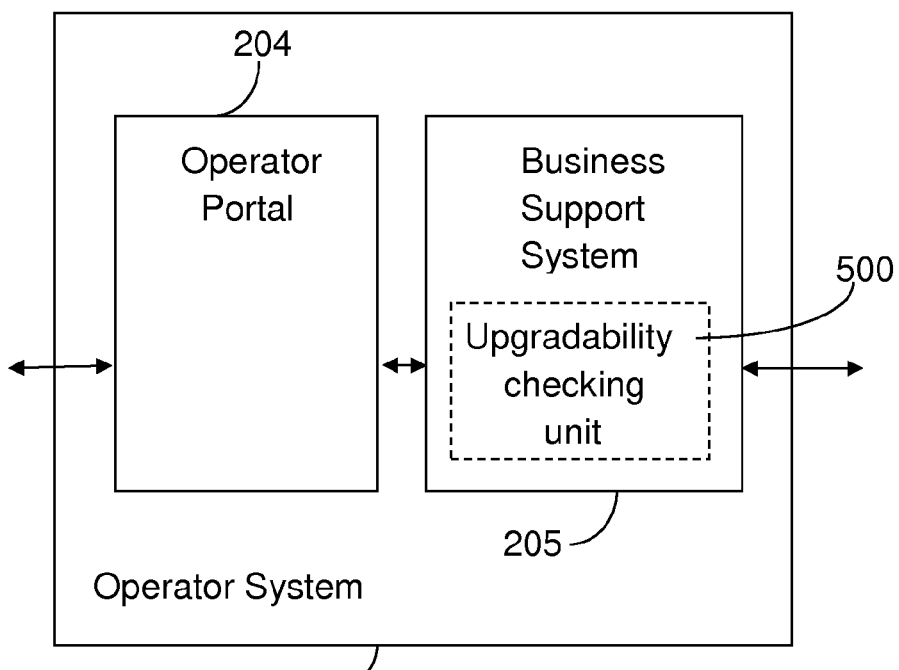
FIG. 5 is another block diagram, illustrating an operator system that is configured to assist in an upgrading procedure of a TV device.

Operator system 203 of FIG. 5 comprises an operator portal 204 that is configured to enable communication with a browser (not shown) of a TV device 200 to be upgraded, and a TV manufacturer system 206 to be executing the upgrading. The operator system 203 also comprises a sub-system that is configured to manage interaction between the operator system 203 and the TV manufacturer system 206. In the present exemplified embodiment this sub-system is referred to as business support system 205. The business support system 205 enables communication with a corresponding business support system, or any other corresponding sub-system of a TV manufacturer system so that preparations for a TV device upgrade procedure can be executed and such that service and billing arrangement between the operator and the TV manufacturer can be settled.

Figure 6:
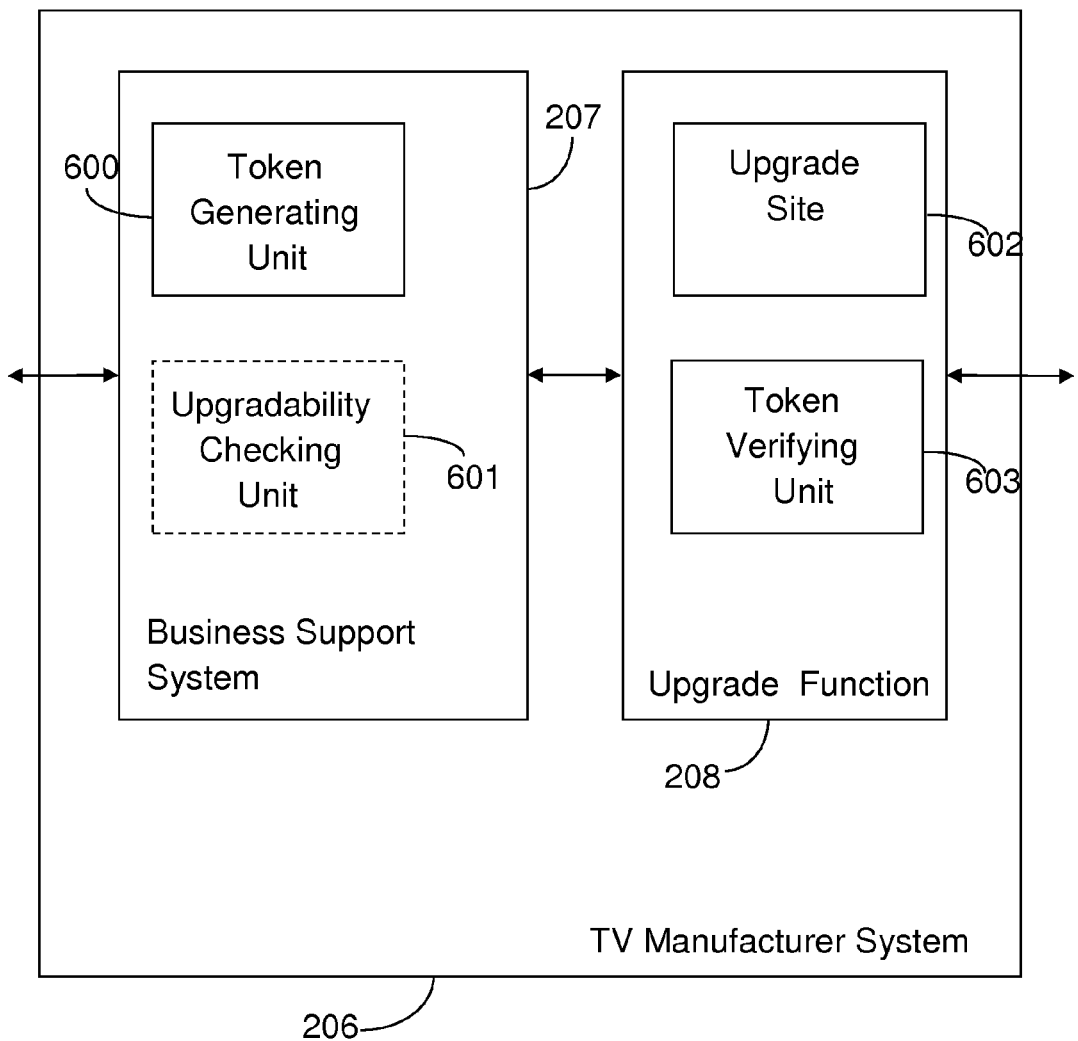
FIG. 6 is yet another block diagram, illustrating a TV manufacturer system that is configured to upgrade a TV device.

Referring now instead to FIG. 6, a TV manufacturer system, that is configured to interact with an operator system (not shown) and a TV device (not shown) so as to allow the TV device to be upgraded will now be described in further detail according to one exemplary embodiment.

As already mentioned above, a TV manufacturer system 206 configured to execute the suggested upgrade procedure, comprises a sub-system, here referred to as a business support system 207 that is configured to communicate with a corresponding business support system of an operator system (not shown), with which an agreement for a service profile upgrade feature has been established. More specifically, the business support system 207 comprises a token generating unit 600 that is configured to generate a token object in response to an upgrade request for a specific TV device 200, received from the operator system. The token generating unit 600 is configured to generate a token object on the condition that TV device specific information provided with the request correspond to certain predefined requirements and to provide such a token object to the operator system for further delivery to the TV device. Alternatively, the Token Generating Unit may be part of the upgrade function 208. The business support system 207 typically also comprises an upgradability checking unit 601.

The TV manufacturer system 206 also comprises an upgrade function 208, which is configured to execute a proprietary upgrade procedure for a TV device for which a valid token object has been verified, including giving a user's TV device access to an upgrade site 602 of the TV manufacturer system 206. The upgrade function 208 also comprises a generic function, here referred to as a token verifying unit 603, which is configured to verify that a token object that has been generated by the TV manufacturer system 206 is valid.

The Upgrade function 208 typically provides a user's TV device access to an upgrade site 602, such that the user of the TV device is given the option to access available upgrade options. Alternatively, the token generating unit 600 is part of the upgrade function 208, or both the business support system 207 and the upgrade function 208. In the latter case a token object may be generated as a result from an interaction between the two functional entities.

While the invention has been described with reference to specific exemplary embodiments, the description is generally only intended to illustrate the inventive concept and should not be taken as a limitation of the scope of the invention, which is defined by the appended claims.

ABBREVIATION LIST

STB—Set Top Box
IPTV—Internet Protocol Television
ITF—IPTV Terminal Function
XML—Extensible Markup Language
HTTP—Hyper Text Transfer Protocol
OITF—Open IPTV Forum Terminal Function

What is claimed is:

1. A method in a television (TV) device of performing an upgrade of the TV device, the TV device being connectable to an internet protocol TV (IPTV) system including an operator system and a TV manufacturer system, the method comprising:
   initiating an upgrade service for a new IPTV service profile for the TV device;
   transmitting an upgrade request message to the operator system;
   receiving, from the TV manufacturer system, a token object generated by the TV manufacturer system to be used for verifying an upgrade of the TV device, the token object comprising a redirection address indicating an upgrade site of the TV manufacturer; and
   returning the token object to the TV manufacturer system, thereby enabling an upgrade of the TV device to be completed from the upgrade site by the TV manufacturer system if the token object is found to be valid.

2. The method of claim 1, further comprising requesting an upgradability check, wherein it is determined based on a device identity (ID) provided from the TV device whether the TV device is upgradable.

3. The method of claim 1, wherein the upgrade request message is an extensible mark-up language (XML) hypertext transfer protocol (HTTP) Request message or a HTTP POST message.

4. The method of claim 1, wherein completion of the upgrade of the TV device is initiated by the TV device's initiating a proprietary upgrade procedure.

5. A method in an operator system of performing an upgrade of a television (TV) device, the operator system being part of an internet protocol TV (IPTV) system also including a TV manufacturer system, the method comprising:
   receiving from the TV device an initiation of an upgrade service for a new IPTV service profile;
   receiving an upgrade request message from the TV device;
   requesting from the TV manufacturer system a token object to be used during the requested upgrade;
   receiving a token object from the TV manufacturer system, the token object being generated by the TV manufacture system for verifying an upgrade of the TV device and comprising a redirection address indicating an upgrade site of the TV manufacturer;
   forwarding the token object to the TV device; and
   receiving the token object back from the TV device and forwarding the token object to the TV manufacturer system, thereby enabling the TV device to execute the requested upgrade from the upgrade site by interacting with the TV manufacturer system if the token object is found to be valid.

6. The method of claim 5, further comprising requesting an upgradability check, wherein it is determined based on a device identity (ID) provided from the TV device whether the TV device is upgradable.

7. The method of claim 6, wherein the upgradability check is executed by the operator system.

8. The method of claim 6, wherein the upgradability check is executed by the TV manufacturer system.

9. The method of claim 6, wherein the upgradability check is based on a device ID identifying the TV device.

10. The method of claim 9, wherein the request for a token object comprises information identifying the TV device.

11. The method of claim 10, wherein the information comprises at least one of a TV device unique identity, a model number, a serial number, and a firmware identifier.

12. The method of claim 5, wherein the upgrade request message is an extensible mark-up language (XML) hypertext transfer protocol (HTTP) Request message or a HTTP POST message.

13. A method in a television (TV) manufacturer system of performing an upgrade of a TV device, the TV manufacturer system being part of an internet protocol TV (IPTV) system that also includes an operator system, the method comprising:
   receiving from the operator system a request for a token object to be used for verifying a requested upgrading;
   generating a token object, comprising a redirection address indicating an upgrade site of the TV manufacturer;
   forwarding the generated token object to the TV device; and
   receiving the token object back from the TV device, thereby enabling the TV device to execute the requested upgrade from the upgrade site by interacting with the TV manufacturer system if the token object is found to be valid.

14. The method of claim 13, wherein validity of the token object is verified by the TV manufacturer system before initiating a proprietary upgrade procedure.

15. The method of claim 13, wherein validity of the token object is verified by the TV manufacturer system during a proprietary upgrade procedure.

* * * * *

UNITED STATES PATENT AND TRADEMARK OFFICE
CERTIFICATE OF CORRECTION

| | | |
|---|---|---|
| PATENT NO. | : 9,053,324 B2 | Page 1 of 1 |
| APPLICATION NO. | : 12/687360 | |
| DATED | : June 9, 2015 | |
| INVENTOR(S) | : Cedervall et al. | |

It is certified that error appears in the above-identified patent and that said Letters Patent is hereby corrected as shown below:

Title Page, in Item (56), under "OTHER PUBLICATIONS", in Column 2, Line 1, delete "Architecure," and insert -- Architecture, --, therefor.

Specification

In Column 7, Line 22, delete "step 10," and insert -- step 2:10, --, therefor.

In Column 7, Line 26, delete "of flow" and insert -- of a call flow --, therefor.

Signed and Sealed this
Fifth Day of April, 2016

Michelle K. Lee
*Director of the United States Patent and Trademark Office*